(12) United States Patent
Aisima et al.

(10) Patent No.: US 10,916,791 B2
(45) Date of Patent: Feb. 9, 2021

(54) FUEL CELL VEHICLE

(71) Applicant: Toyota Jidosha Kabushiki Kaisha, Toyota (JP)

(72) Inventors: Tetuji Aisima, Toyota (JP); Tomoyuki Kozuka, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 214 days.

(21) Appl. No.: 16/238,109

(22) Filed: Jan. 2, 2019

(65) Prior Publication Data
US 2019/0214668 A1 Jul. 11, 2019

(30) Foreign Application Priority Data

Jan. 11, 2018 (JP) .................. 2018-002316

(51) Int. Cl.
| | | |
|---|---|---|
| *H01M 8/2465* | (2016.01) | |
| *B60L 50/72* | (2019.01) | |
| *B60L 50/71* | (2019.01) | |
| *B62D 25/14* | (2006.01) | |
| *B60K 1/04* | (2019.01) | |
| *B62D 21/15* | (2006.01) | |

(52) U.S. Cl.
CPC ............ *H01M 8/2465* (2013.01); *B60K 1/04* (2013.01); *B60L 50/71* (2019.02); *B60L 50/72* (2019.02); *B62D 21/152* (2013.01); *B60K 2001/0411* (2013.01); *B62D 25/14* (2013.01); *H01M 2250/20* (2013.01)

(58) Field of Classification Search
CPC .. B60L 50/71; B60L 50/72; B60K 2001/0411; B62D 25/14; H01M 2250/20; H01M 8/2465
See application file for complete search history.

(56) References Cited

U.S. PATENT DOCUMENTS

| | | | |
|---|---|---|---|
| 2015/0244006 A1* | 8/2015 | Yoshitomi ......... | H01M 8/04201 429/446 |
| 2017/0101031 A1 | 4/2017 | Ohashi | |
| 2018/0166733 A1* | 6/2018 | Kamino ............. | H01M 8/2484 |
| 2018/0358637 A1* | 12/2018 | Takeyama ......... | H01M 8/04097 |

FOREIGN PATENT DOCUMENTS

JP 2017-74819 A 4/2017

* cited by examiner

*Primary Examiner* — Jonathan G Jelsma

(74) *Attorney, Agent, or Firm* — Dinsmore & Shohl LLP

(57) ABSTRACT

A fuel cell vehicle includes a front compartment and a metallic dash panel in a front side of the vehicle. The front compartment houses a fuel cell stack, a gas-liquid separator, and a fuel gas pump. The dash panel is disposed between the front compartment and a cabin to partition them. The fuel gas pump is mounted to a lower portion of a stack frame in a state of projecting from the stack frame toward the dash panel side. The gas-liquid separator is mounted to a lower portion of the fuel gas pump in a state of projecting from the stack frame and the fuel gas pump toward the dash panel side. The fuel gas pump is made of metal, and the gas-liquid separator is made of resin.

2 Claims, 5 Drawing Sheets

… (1) …

FUEL CELL VEHICLE

CROSS REFERENCE TO RELATED APPLICATIONS

The present application claims priority from Japanese patent application JP 2018-002316 filed on Jan. 11, 2018, the content of which is hereby incorporated by reference into this application.

BACKGROUND

Technical Field

The present disclosure relates to a fuel cell vehicle that includes a fuel cell stack.

Background Art

Conventionally, a fuel cell vehicle includes a fuel cell stack and its peripheral devices (auxiliary machines) in a front compartment on a front side of the vehicle. The fuel cell stack is placed on a stack frame secured to the front compartment, and the auxiliary machines such as a compressor and a fuel gas pump are mounted to a lower portion of the stack frame (see, for example, JP 2017-74819 A).

SUMMARY

Here, the fuel gas pump mounted to the lower portion of the stack frame collects a fuel off-gas from the fuel cell stack, and supplies a part of the collected fuel off-gas to the fuel cell stack as a fuel gas again. Since the fuel cell stack is placed on the stack frame, to circulate the fuel gas to the fuel cell stack with the fuel gas pump in a shorter route, it is assumed that, for example, the fuel gas pump is mounted to the stack frame so as to project from the stack frame toward a dash panel side.

However, in such a case, when the fuel cell vehicle collides head-on, the fuel cell stack and the auxiliary machines mounted to the stack frame move to the dash panel side with the stack frame, and the fuel gas pump projecting from the stack frame is possibly damaged.

The present disclosure has been made in view of the above-described problems, and provides a fuel cell vehicle configured to reduce damage on a fuel gas pump at a time of a vehicle front collision.

In view of the above-described problem, a fuel cell vehicle according to the present disclosure includes a fuel cell stack, a gas-liquid separator that separates gas and liquid from a fuel off-gas discharged from the fuel cell stack, and a fuel gas pump that circulates the fuel off-gas from which the liquid component has been separated by the gas-liquid separator to the fuel cell stack. The fuel cell vehicle includes a front compartment and a metallic dash panel on a front side of the vehicle. The front compartment houses the fuel cell stack, the gas-liquid separator, and the fuel gas pump. The dash panel partitions the front compartment and a cabin. The fuel cell stack is placed on a stack frame. The stack frame is secured to the front compartment. The fuel gas pump is mounted to a lower portion of the stack frame in a state of projecting from the stack frame toward the dash panel side. The gas-liquid separator is mounted to a lower portion of the fuel gas pump in a state of projecting from the stack frame and the fuel gas pump toward the dash panel side. The fuel gas pump is made of metal. The gas-liquid separator is made of resin.

With the present disclosure, the stack frame mounted to the front compartment moves to the dash panel side at the time of the vehicle front collision. At this time, since the gas-liquid separator is mounted to the fuel gas pump in the state of projecting from the stack frame and the fuel gas pump toward the dash panel side, the gas-liquid separator contacts the dash panel before the fuel gas pump contacts the dash panel. Since the dash panel is made of metal while the gas-liquid separator is made of resin, the gas-liquid separator is damaged. Thus, the gas-liquid separator can buffer an impact force on the fuel gas pump at the time of the collision. The gas-liquid separator having a relatively simple configuration at a low cost can reduce a repair cost.

Here, while a securing structure of the fuel gas pump to the stack frame is not specifically limited, in some aspects, the fuel gas pump may be secured to the stack frame via a bracket such that a rotation axis line of a motor that drives the fuel gas pump inclines with respect to a reference line along a front-rear direction of the fuel cell vehicle in plan view of the fuel cell vehicle. The bracket may have a mounting portion extending in a horizontal direction. The mounting portion may have a supporting hole through which a fastening member is inserted. The fastening member may secure the bracket to the stack frame. The fuel gas pump may be secured turnably in the horizontal direction around the supporting hole of the bracket.

With this aspect, when the impact is large at the vehicle collision, while the fuel gas pump further retreats with the stack frame to contact the dash panel, the fuel gas pump turns in a direction moving away from the dash panel around the fastening member inserted through the supporting hole. In view of this, the impact on the fuel gas pump against the dash panel can be reduced.

The fuel cell vehicle of the present disclosure can reduce the damage on the fuel gas pump at the time of the vehicle front collision.

DETAILED DESCRIPTION

Figure 1:
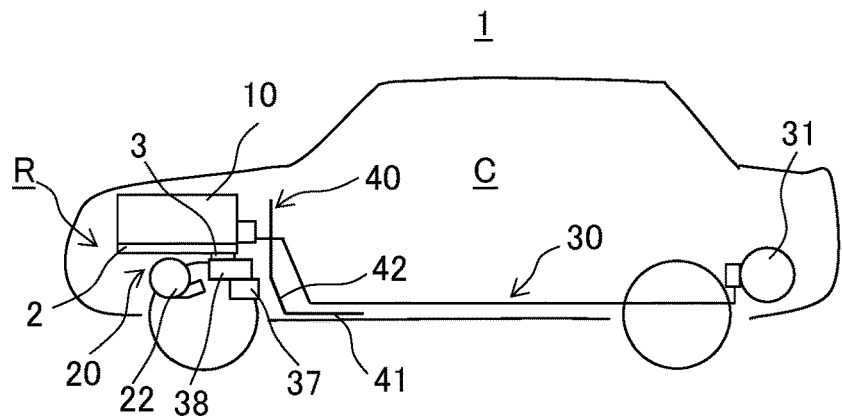
FIG. 1 is a conceptual diagram of one embodiment of a fuel cell vehicle according to the present disclosure.
Figure 2:
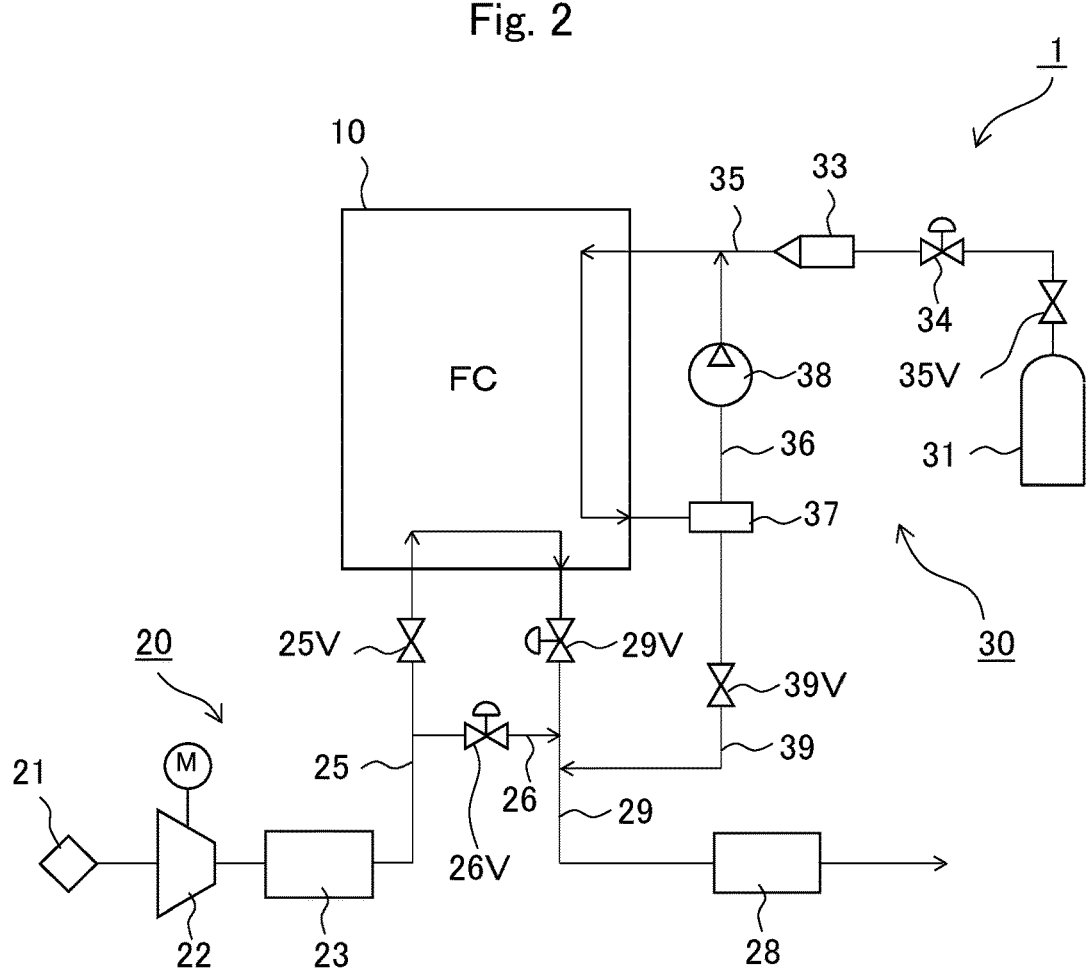
FIG. 2 is a system block diagram of a fuel cell system used in the fuel cell vehicle illustrated in FIG. 1.
Figure 3:
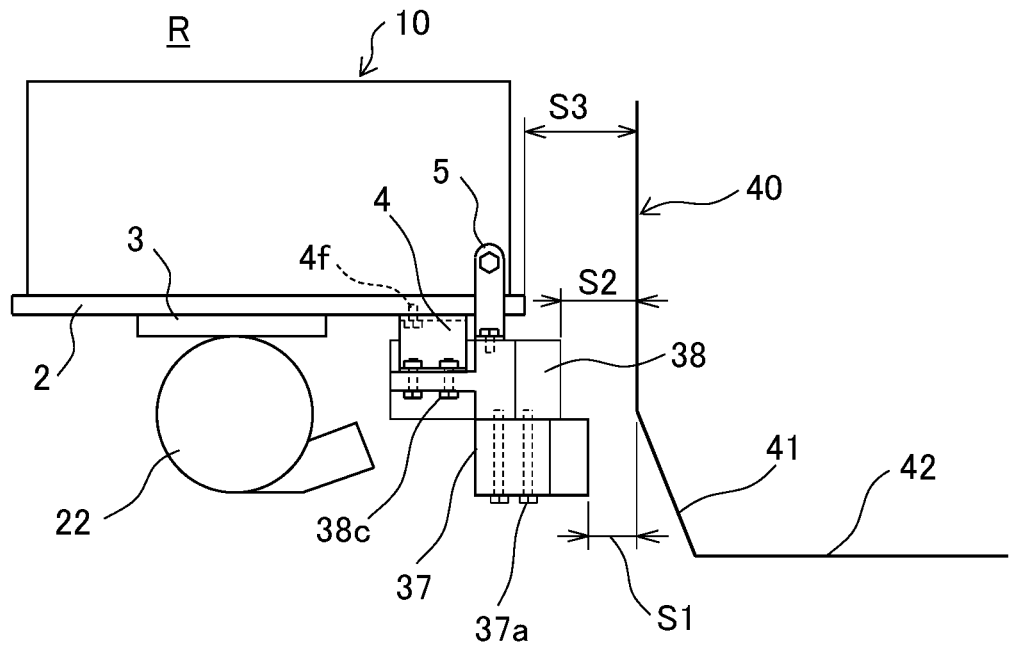
FIG. 3 is a main part schematic diagram illustrating a side surface of a main part of the fuel cell vehicle in the one embodiment illustrated in FIG. 1.
Figure 4:
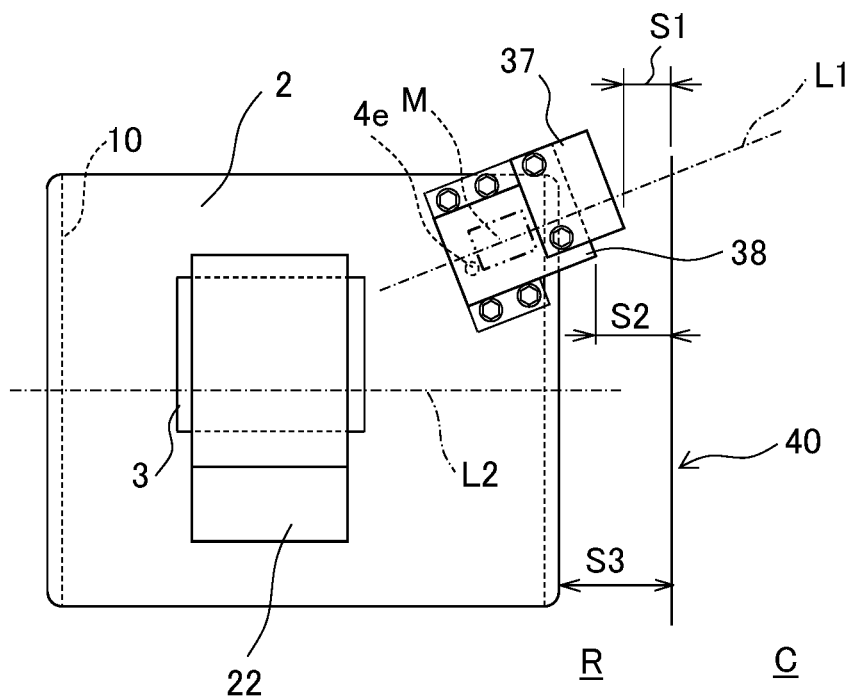
FIG. 4 is a main part schematic diagram illustrating a bottom surface of the main part illustrated in FIG. 3.
Figure 5:
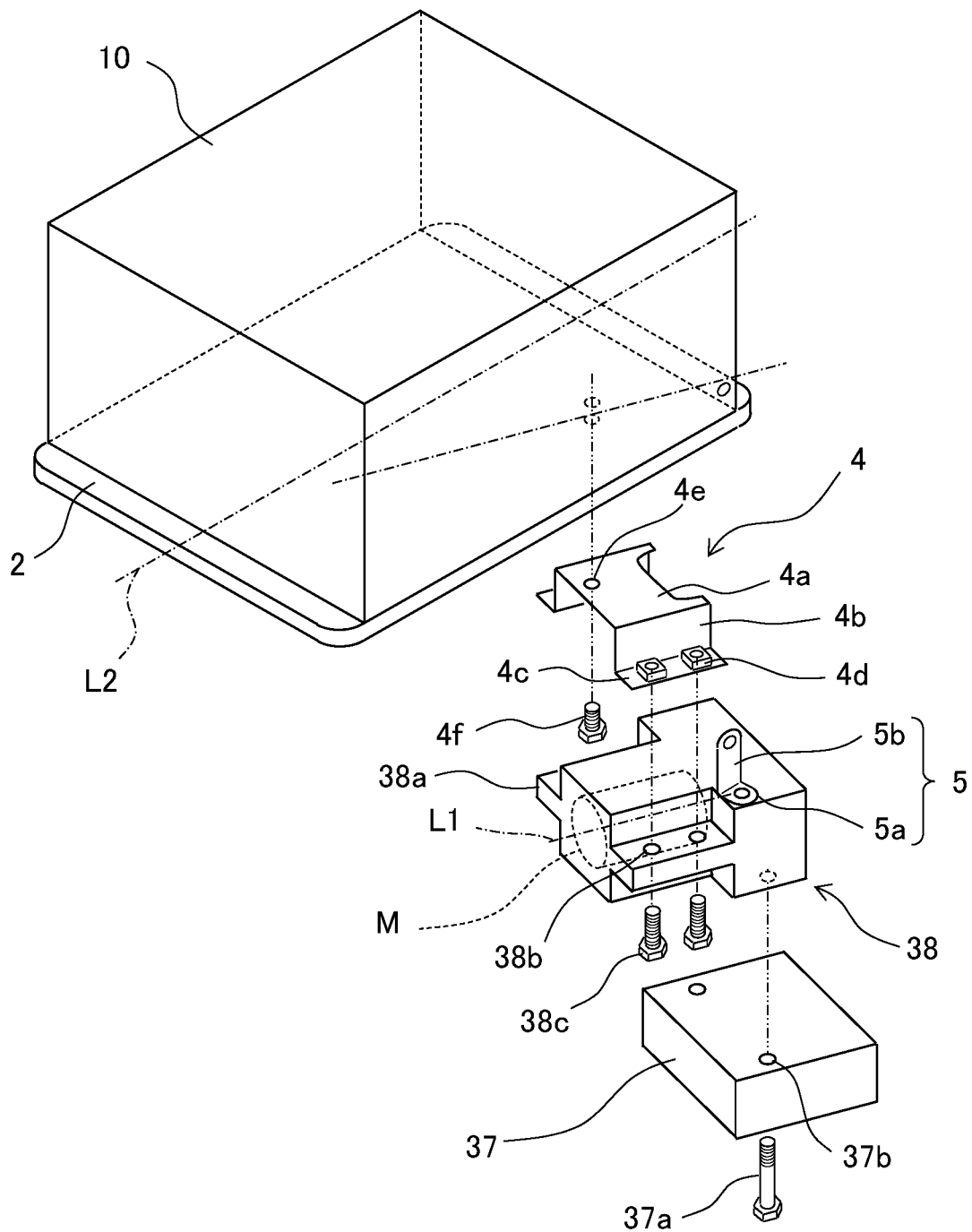
FIG. 5 is a developed perspective view of the main part illustrated in FIG. 3 and FIG. 4.

The following describes one embodiment of a fuel cell vehicle according to the present disclosure with reference to the drawings in detail. FIG. 1 is a conceptual diagram of the fuel cell vehicle according to the embodiment, and FIG. 2 is a system block diagram of a fuel cell system used in the fuel cell vehicle illustrated in FIG. 1. FIG. 3 is a main part schematic diagram illustrating a side surface of a main part of the fuel cell vehicle in the one embodiment illustrated in FIG. 1 and FIG. 2. FIG. 4 is a main part schematic diagram illustrating a bottom surface of the main part illustrated in FIG. 3. FIG. 5 is a developed perspective view of the main part illustrated in FIG. 3 and FIG. 4.

First, the fuel cell vehicle according to the present disclosure will be described with reference to FIG. 1. In FIG. 1, a fuel cell vehicle 1 is a vehicle such as a passenger car, and has a front compartment R on a front side of the vehicle. The front compartment R houses a fuel cell stack 10, a compressor 22, a gas-liquid separator 37, and a fuel gas pump 38 such as a hydrogen pump. The compressor 22, the gas-liquid separator 37, and the fuel gas pump 38 are included as a part of the auxiliary machines. The compressor 22 constitutes a part of an oxidant gas supply system 20 that supplies an oxidant gas to the fuel cell stack 10. The gas-liquid separator 37 and the fuel gas pump 38 constitute a circulation passage 36 that circulates a fuel off-gas discharged from the fuel cell stack 10 to the fuel cell stack 10 (see FIG. 2).

The fuel cell vehicle 1 includes a dash panel 40 between the front compartment R and a cabin C, on which a passenger rides, to partition them in the front side of the vehicle. The dash panel 40 is a metallic panel formed of, for example, steel or aluminum alloy, and has a high rigidity compared with the gas-liquid separator 37. The dash panel 40 includes a floor board 41 that constitutes a floor surface of the cabin C and a toe board 42 that inclinedly extends upward from this floor board 41. The dash panel 40 includes a reinforcing material (not illustrated) to ensure a space for the cabin C. The reinforcing material has a high rigidity compared with the fuel gas pump 38.

As illustrated in FIG. 3, the fuel cell stack 10 is placed on a top of a stack frame 2, and the stack frame 2 is secured to the front compartment R. The compressor 22 is mounted and secured to a lower portion of the stack frame 2 via a compressor bracket 3 in a suspended state. The fuel gas pump 38 is mounted to the lower portion of the stack frame 2 in a state of projecting from the stack frame 2 toward the dash panel 40 side and a state of being suspended via a bracket 4.

The gas-liquid separator 37 is mounted to a lower portion of the fuel gas pump 38 in a state of projecting from the stack frame 2 and the fuel gas pump 38 toward the dash panel 40 side. The fuel gas pump 38 is a metallic device made of a metallic material such as an iron-based material and an aluminum-based material, and the gas-liquid separator 37 is a device made of resin, such as polyphenylene sulfide (PPS) and polyamide (PA). Then, the fuel cell vehicle 1 has a rear portion to which a fuel gas supply source 31, which constitutes a fuel gas supply system 30 to supply hydrogen gas to the fuel cell stack 10, is mounted.

Next, the system configuration of the fuel cell system used in the fuel cell vehicle according to the present disclosure will be described with reference to FIG. 2. The fuel cell system illustrated in FIG. 2 includes, for example, a fuel cell (fuel cell stack) 10, the oxidant gas supply system 20, and the fuel gas supply system 30. The fuel cell (fuel cell stack) 10 includes a plurality of stacked cells for fuel cell as unit cells. The oxidant gas supply system 20 supplies the fuel cell 10 with an oxidant gas such as air. The fuel gas supply system 30 supplies the fuel cell 10 with a fuel gas such as hydrogen.

For example, the cell for fuel cell of the solid polymer fuel cell 10 includes a Membrane Electrode Assembly (MEA), which includes an ion permeable electrolyte membrane, an anode side catalyst layer (anode electrode), and a cathode side catalyst layer (cathode electrode). This electrolyte membrane is sandwiched between the anode side catalyst layer and the cathode side catalyst layer. The MEA has both sides on which Gas Diffusion Layers (GDL) are formed to supply the fuel gas or the oxidant gas and collect electricity generated through an electrochemical reaction. The Membrane Electrode Assembly having both sides on which the GDLs are disposed is referred to as a Membrane Electrode & Gas Diffusion Layer Assembly (MEGA), and the MEGA is sandwiched by a pair of separators. Here, the MEGA serves as a power generation unit of the fuel cell, and when the gas diffusion layer is not disposed, the MEA serves as the power generation unit of the fuel cell.

The oxidant gas supply system 20 includes, for example, an oxidant gas supply passage 25 and an oxidant gas discharge passage 29. The oxidant gas supply passage 25 supplies (the cathode electrode of) the fuel cell 10 with the oxidant gas. The oxidant gas discharge passage 29 discharges an oxidant off-gas, in which the oxidant gas has been supplied to the fuel cell 10 and has been used for the electrochemical reaction in each of the cells for fuel cell, from the fuel cell 10. Furthermore, a bypass passage 26 is disposed to flow the oxidant gas supplied via the oxidant gas supply passage 25 to the oxidant gas discharge passage 29 without via the fuel cell 10. The flow passages of the oxidant gas supply system 20 can be each formed of a pipe such as a rubber hose and a metallic pipe.

The oxidant gas supply passage 25 includes, for example, an air cleaner 21, the compressor 22, and an intercooler 23 from an upstream side, and the oxidant gas discharge passage 29 includes, for example, a muffler 28. (The air cleaner 21 of) the oxidant gas supply passage 25 includes, for example, an atmospheric pressure sensor and an air flow meter, which are not illustrated.

On the oxidant gas supply passage 25, the air cleaner 21 removes dust in the oxidant gas (air and the like) taken from the atmosphere. The compressor 22 compresses the oxidant gas taken in via the air cleaner 21 and pressure-feeds the compressed oxidant gas to the intercooler 23. The intercooler 23 cools the oxidant gas, which is pressure-fed from the compressor 22 and taken in, through, for example, a heat exchange with a coolant to supply to (the cathode electrode of) the fuel cell 10 when the oxidant gas passes through. The oxidant gas supply passage 25 includes an inlet valve 25V to shut off the flow of the oxidant gas between the intercooler 23 and the fuel cell 10.

The bypass passage 26 has one end coupled to (the intercooler 23 or its downstream side of) the oxidant gas supply passage 25, and the other end coupled to the oxidant gas discharge passage 29. The oxidant gas that has been pressure-fed by the compressor 22 and has been cooled and discharged by the intercooler 23 flows through the bypass passage 26 toward the oxidant gas discharge passage 29 while bypassing the fuel cell 10. This bypass passage 26 includes a bypass valve 26V that shuts off the oxidant gas flowing toward the oxidant gas discharge passage 29 to adjust a flow rate of the oxidant gas flowing through this bypass passage 26.

On the oxidant gas discharge passage 29, the muffler 28 separates the oxidant off-gas (exhaust gas) flowing into the oxidant gas discharge passage 29 into, for example, a gas phase and a liquid phase to discharge outside. The oxidant gas discharge passage 29 includes a pressure regulating valve 29V to regulate a back-pressure of the oxidant gas supplied to the fuel cell 10. The above-described bypass passage 26 is coupled to a downstream side of the pressure regulating valve 29V.

Meanwhile, the fuel gas supply system 30 includes, for example, the fuel gas supply source 31 such as a hydrogen tank, a fuel gas supply passage 35, the circulation passage 36, and a fuel gas discharge passage 39. The fuel gas supply source 31 stores a high pressure fuel gas such as hydrogen. The fuel gas supply passage 35 supplies the fuel gas from the fuel gas supply source 31 to (the anode electrode of) the fuel cell 10. The circulation passage 36 recirculates the fuel off-gas (unconsumed fuel gas) discharged from the fuel cell 10 to the fuel gas supply passage 35. The fuel gas discharge passage 39 is branched and coupled to the circulation passage 36 to discharge the fuel off-gas inside the circulation passage 36 to the outside (atmospheric release). The flow passages of the fuel gas supply system 30 can be each formed of a pipe such as a rubber hose and a metallic pipe.

The fuel gas supply passage 35 includes a shut-off valve 35V, a regulator 34, and an injector 33. The shut-off valve 35V opens and closes the fuel gas supply passage 35 to shut off the fuel gas flowing toward the fuel cell 10. The regulator 34 regulates (decompresses) a pressure of the fuel gas flowing through the fuel gas supply passage 35. The injector 33 supplies the fuel gas whose pressure has been regulated toward the fuel cell 10. Opening the shut-off valve 35V causes the high pressure fuel gas stored in the fuel gas supply source 31 to flow into the fuel gas supply passage 35 from the fuel gas supply source 31, and the high pressure fuel gas is supplied to (the anode electrode of) the fuel cell 10 with the pressure regulated (decompressed) by the regulator 34 and the injector 33.

The circulation passage 36 includes the gas-liquid separator 37, a circulation pump (hydrogen pump in other words) 38, and similar unit from an upstream side (fuel cell 10 side). The gas-liquid separator 37 performs gas-liquid separation to store generated water contained in the fuel gas (for example, hydrogen) flowing through the circulation passage 36. The fuel gas discharge passage 39 branches from this gas-liquid separator 37. The circulation pump 38 pressure-feeds the fuel off-gas generated through the gas-liquid separation by the gas-liquid separator 37 to circulate in the fuel gas supply passage 35.

The fuel gas discharge passage 39 includes a purge valve 39V that opens and closes the fuel gas discharge passage 39 to discharge the generated water separated by the gas-liquid separator 37 and a part of the fuel off-gas discharged from the fuel cell 10. The fuel off-gas is discharged, through the opening/closing adjustment by the purge valve 39V of the fuel gas discharge passage 39, mixed with the oxidant off-gas flowing through the oxidant gas discharge passage 29, and released outside into the atmosphere via the muffler 28.

The fuel cell system having the above-described configuration performs, the electric generation through the electro-chemical reaction between the oxidant gas such as air supplied to (the cathode electrode of) the fuel cell 10 by the oxidant gas supply system 20 and the fuel gas such as hydrogen supplied to (the anode electrode of) the fuel cell 10 by the fuel gas supply system 30.

Next, distinctive configurations of the fuel cell vehicle 1 according to this embodiment will be described in detail with reference to FIGS. 3 to 6. The fuel cell vehicle 1 of this embodiment includes the compressor 22, the gas-liquid separator 37, and the fuel gas pump 38 in the front compartment R. The compressor 22 compresses and discharges the oxidant gas supplied to the fuel cell stack 10. The gas-liquid separator 37 separates the gas and the liquid from the fuel off-gas discharged from the fuel cell stack 10. The fuel gas pump 38 is, for example, a hydrogen pump, and circulates the fuel off-gas from which the liquid component has been separated by the gas-liquid separator 37 to the fuel cell stack 10.

More specifically, the fuel cell stack 10 is mounted on the top of the stack frame 2, and the compressor 22 is mounted to the lower portion of the stack frame 2 via the compressor bracket 3 on a vehicle front side with respect to the fuel gas pump 38.

The fuel gas pump 38 is mounted to the lower portion of the stack frame 2 via the bracket 4 on a vehicle rear side with respect to the compressor 22 in a state of projecting from the stack frame 2 toward the dash panel 40 side. Furthermore, the fuel gas pump 38 is secured to the fuel cell stack 10 (specifically, a stack case) via an L-shaped bracket 5.

The gas-liquid separator 37 is mounted to a lower portion of the fuel gas pump 38 in a state of projecting from the stack frame 2 and the fuel gas pump 38 toward the dash panel 40 side with fastening members 37a such as bolts inserted through through holes 37b.

In such a mounting state, the fuel gas pump 38 has an end surface in the vehicle rear side projecting rearward with respect to an end surface of the fuel cell stack 10 in the vehicle rear side, and the gas-liquid separator 37 has an end surface in the vehicle rear side projecting rearward with respect to the end surface of the fuel gas pump 38 in the vehicle rear side.

Specifically, spaces S1 to S3 between the dash panel 40 and the gas-liquid separator 37, the fuel gas pump 38, and the stack frame 2 in a front-rear direction of the fuel cell vehicle 1 fulfill the following relationship. Among these spaces S1 to S3, the space S1 between the dash panel 40 and the gas-liquid separator 37 is smallest, the space S2 between the dash panel 40 and the fuel gas pump 38 is larger than the space S1, and the space S3 between the dash panel 40 and the stack frame 2 is further larger than the space S2.

The gas-liquid separator 37 closest to the dash panel 40 is substantially made of resin, and has a low rigidity compared with the fuel gas pump 38. Furthermore, the fuel gas pump 38 is substantially made of metal, and has a high rigidity compared with the gas-liquid separator 37.

As illustrated in FIG. 4 and FIG. 5, in the fuel cell vehicle 1, the fuel gas pump 38 is secured to the stack frame 2 via the bracket 4 such that a rotation axis line L1 of a motor M that drives the fuel gas pump 38 inclines with respect to a reference line L2 along the front-rear direction of the fuel cell vehicle 1 in plan view of the fuel cell vehicle 1.

In view of this, the fuel gas pump 38 is obliquely arranged and secured with respect to a travelling direction of the fuel cell vehicle 1, a rear corner portion of the fuel gas pump 38 faces a front surface of the dash panel 40, and this corner portion is close to the dash panel 40. A rear corner portion of the gas-liquid separator 37 also faces a front surface of the dash panel 40, and this corner portion is further close to the dash panel 40.

The iron bracket 4 to mount and secure the fuel gas pump 38 to the stack frame 2 has a mounting portion 4a extending in a horizontal direction. Furthermore, this bracket 4 has sandwiching portions 4b, 4b extending downward from both sides of the mounting portion 4a to sandwich the fuel gas pump 38, and moreover, this bracket 4 has mounting portions 4c, 4c extending outward from the sandwiching portions 4b, 4b, thus this bracket 4 is formed in an approximately saddle shape. Then, two weld nuts 4d are fixedly secured on each of the mounting portions 4c, 4c, four weld nuts 4d in total, to fasten the fuel gas pump 38.

Furthermore, the mounting portion 4a of the bracket 4 has a supporting hole 4e penetrating the mounting portion 4a.

The supporting hole 4e is disposed to secure (support) this bracket 4 to the stack frame 2. A fastening member 4f such as a bolt is inserted through this supporting hole 4e to be screwed into a female screw hole opened on a lower surface of the stack frame 2, thus the bracket 4 can be secured to the lower side of the stack frame 2. With this supporting hole 4e, the fuel gas pump 38 is secured (supported) turnably in the horizontal direction around the supporting hole 4e of the bracket 4.

The fuel gas pump 38 has flanges 38a, 38a projecting from both side surfaces and extending in the horizontal direction, and the flanges 38a, 38a have four through holes 38b corresponding to the four weld nuts 4d fixedly secured to the mounting portions 4c, 4c of the bracket 4. Bolts 38c and the like are inserted through these four through holes 38b, thus the fuel was pump 38 can be mounted to the bracket 4 secured to the lower side of the stack frame 2 with the fastening member 4f.

Figure 6:
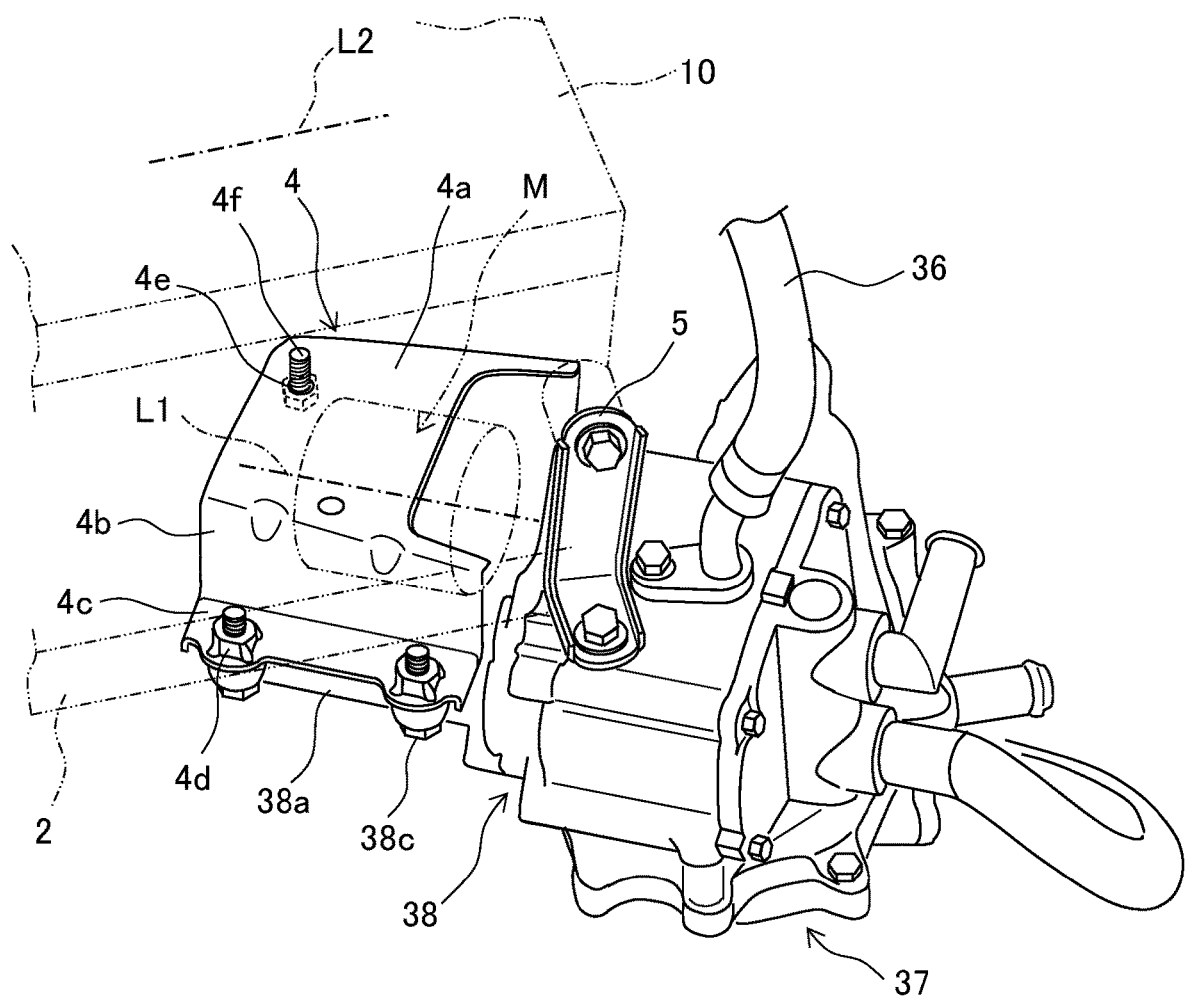
FIG. 6 is a main part perspective view of a fuel gas pump and a gas-liquid separator illustrated in FIG. 3 to FIG. 5.

Furthermore, as illustrated in FIG. 5 and FIG. 6, mounting the fuel gas pump 38 to the bracket 4 secured to the lower side of the stack frame 2 secures the top of the fuel gas pump 38 to the L-shaped bracket 5. That is, the L-shaped bracket 5 has an L-shaped lower arm 5a secured to the top surface of the fuel gas pump 38 with a bolt and the like, and an L-shaped upper arm 5b secured to the stack case of the fuel cell stack 10, thus the fuel gas pump 38 is mounted to the fuel cell stack 10 with the bracket 4 and the U-shaped bracket 5. Mounting the fuel gas pump 38 to the fuel cell stack 10 with the bracket 4 and the L-shaped bracket 5 stabilizes the mounting state.

The gas-liquid separator 37 is made of resin to be light in weight, and mounted with the fastening members 37a such as bolts screwed into two female screw holes formed on the lower surface of the fuel gas pump 38. The gas-liquid separator 37 has a function to separate the gas and the liquid from the fuel off-gas discharged from the fuel cell stack 10. The separated liquid component joins with the oxidant off-gas discharged from the fuel cell stack 10, and is discharged outside the fuel cell vehicle 1.

Effects of the fuel cell vehicle of the embodiment configured as described above will be described with reference to FIG. 7 and FIG. 8. For example, when the fuel cell vehicle 1 collides against an obstacle and the like, the front compartment R of the vehicle is squashed and deformed, and the fuel cell stack 10 and the accompanied auxiliary machines are moved rearward by the obstacle. The fuel cell stack 10, the compressor 22, the fuel gas pump 38, and the gas-liquid separator 37, which are mounted to the stack frame 2, move rearward to approach the dash panel 40.

Figure 7:
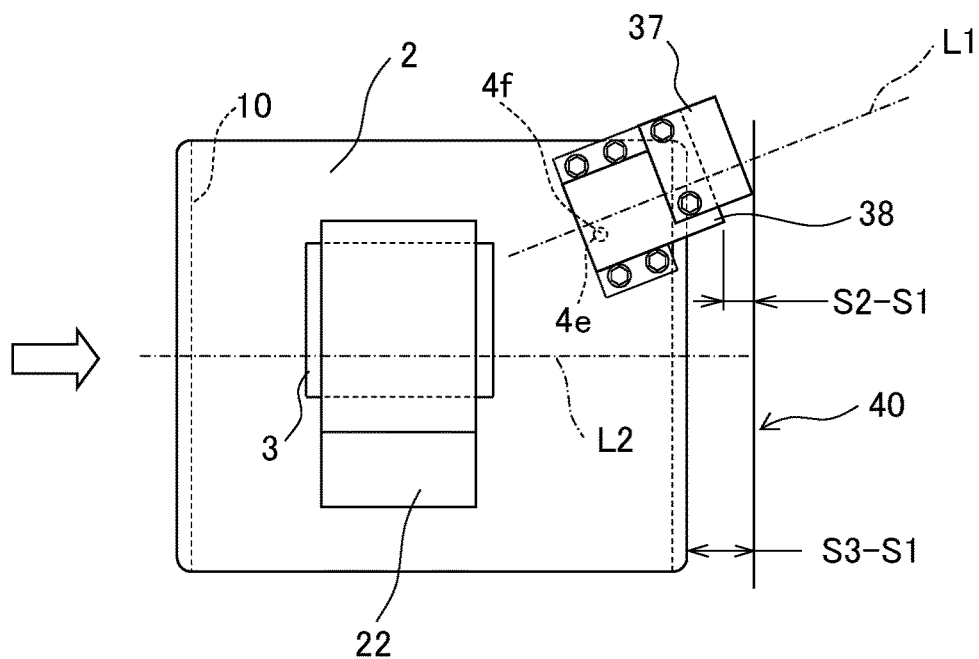
FIG. 7 is a main part schematic diagram illustrating a behavior at a time of a collision with a small impact.

When an impact of the collision is small, as illustrated in FIG. 7, the fuel cell stack 10 and, the auxiliary machines only approach the dash panel 40. When the gas-liquid separator 37 abuts on the dash panel 40, a space between the fuel gas pump 38 and the dash panel 40 becomes (S2-S1), and a space between the stack frame 2 and the dash, panel 40 becomes (S3-S1).

When the impact of the collision is large, the gas-liquid separator 37 positioned most rearward collides against the metallic dash panel 40 and is broken. The gas-liquid separator 37 made of resin is easily broken to absorb the impact. In the case of further large impact, the fuel gas pump 38 collides against the dash panel 40.

Figure 8:
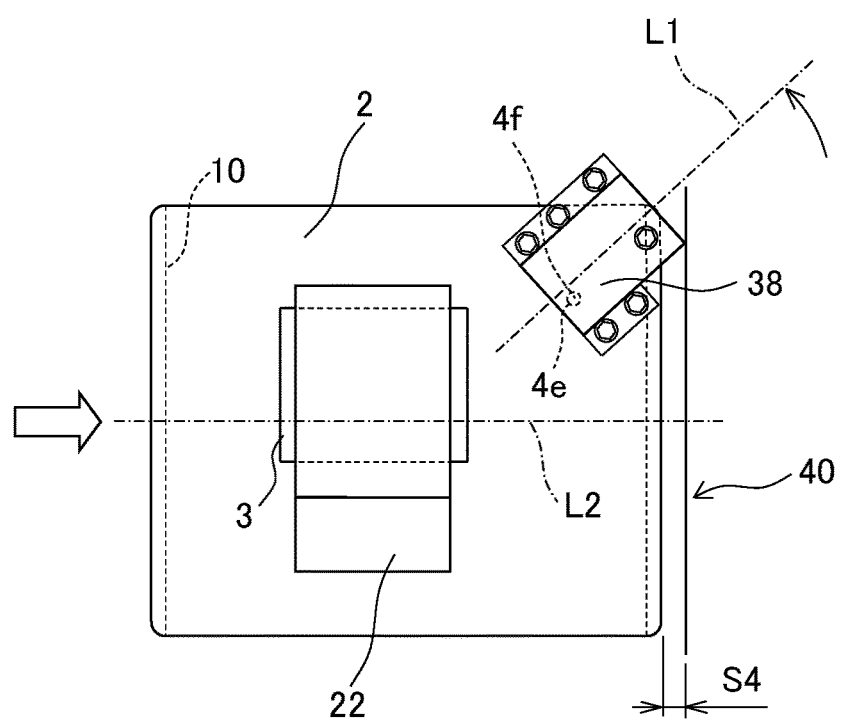
FIG. 8 is a main part schematic diagram illustrating a behavior at a time of a collision with a large impact.

When the fuel gas pump 38 collides against the dash panel 40, as illustrated in FIG. 8, the rear corner portion of the fuel gas pump 38 abuts on the dash panel 40, a reactive force occurs on this rear corner portion. Here, the fuel gas pump 38 is mounted to the stack frame 2 with the bracket 4 and the L-shaped bracket 5, and the bracket 4 positioned downward is secured to the stack frame 2 with the fastening member 4f such as a bolt inserted through the one supporting hole 4c of the mounting portion 4a. Furthermore, the fuel gas pump 38 is secured to the stack frame 2 via the bracket 4 such that the rotation axis line L1 of the motor M that drives the fuel gas pump 38 inclines with respect to the reference line L2 along the front-rear direction of the fuel cell vehicle 1. In view of this, a rotation force is generated around the fastening member 4f in a direction in which the fuel gas pump 38 moves away from the dash panel 40. Specifically, the rotation axis line L1 of the fuel gas pump 38 turns around the fastening member 4f inserted through the supporting hole 4e in a counterclockwise direction (direction to the outside of the vehicle) in FIG. 8.

When the fuel gas pump 38 turns in the counterclockwise direction, the fuel gas pump 38 no longer presses the dash panel 40, thus ensuring avoiding the pressing against the dash panel 40 by the fuel gas pump 38. This ensures avoiding the damage on the fuel gas pump 38 and the dash panel 40. With the turn of the fuel gas pump 38, the L-shaped bracket 5 positioned on the upper side is twisted and deformed, thus absorbing the impact. The turn of the fuel gas pump 38 provides a space S4 between the stack frame 2 and the dash panel 40.

Thus, even when the front compartment R is squashed due to the collision and the like, and the fuel cell stack 10 and the auxiliary machines such as the compressor 22, the fuel gas pump 38, and the gas-liquid separator 37 retreat with the stack frame 2, the fuel gas pump 38 turns away to ensure reduction of the damage on the fuel gas pump 38. The damages on a high-voltage cable (not illustrated) that supplies power source to the fuel gas pump 38 and on a low-pressure pipe constituting the circulation passage 36 (see FIG. 6) can be restricted as well.

One embodiment of the present disclosure has been described in detail above, the present disclosure is not limited to the above-described embodiment, and can be subjected to various kinds of changes of design without departing from the spirit of the present disclosure described in the claims. For example, while the rotation axis line of a drive shaft of the motor that drives the pump has been exemplified as the reference line of the fuel gas pump, the configuration is not limited to this, and a center line in a longitudinal direction passing through the center of gravity of the fuel gas pump may be used.

The fastening bolt has been exemplified as the rotational center around which the fuel gas pump turns away from the dash panel at the time of collision, a configuration where a shaft material such as a pin is used to turn the fuel gas pump may be employed.

What is claimed is:

1. A fuel cell vehicle comprising:
   a fuel cell stack;
   a gas-liquid separator that separates gas and liquid from a fuel off-gas discharged from the fuel cell stack; and
   a fuel gas pump that circulates the fuel off-gas from which the liquid component has been separated by the gas-liquid separator to the fuel cell stack,
   wherein the fuel cell vehicle includes a front compartment and a metallic dash panel in a front side of the vehicle, the front compartment houses the fuel cell stack, the gas-liquid separator, and the fuel gas pump, and the dash panel partitions the front compartment and a cabin,
   wherein the fuel cell stack is placed on a stack frame, and the stack frame is secured to the front compartment, wherein the fuel gas pump is mounted to a lower portion of the stack frame in a state of projecting from the stack frame toward the dash panel side, wherein the gas-liquid separator is mounted to a lower portion of the fuel gas pump in a state of projecting from the stack frame and the fuel gas pump toward the dash panel side, and wherein the fuel gas pump is made of metal, and the gas-liquid separator is made of resin.

2. The fuel cell vehicle according to claim 1, wherein the fuel gas pump is secured to the stack frame via a bracket such that a rotation axis line of a motor that drives the fuel gas pump inclines with respect to a reference line along a front-rear direction of the fuel cell vehicle in plan view of the fuel cell vehicle, wherein the bracket has a mounting portion extending in a horizontal direction, the mounting portion has a supporting hole through which a fastening member is inserted, the fastening member secures the bracket to the stack frame, and wherein the fuel gas pump is secured turnably in the horizontal direction around the supporting hole of the bracket.

\* \* \* \* \*

UNITED STATES PATENT AND TRADEMARK OFFICE
CERTIFICATE OF CORRECTION

PATENT NO. : 10,916,791 B2  
APPLICATION NO. : 16/238109  
DATED : February 9, 2021  
INVENTOR(S) : Tetuji Aisima and Tomoyuki Kozuka It is certified that error appears in the above-identified patent and that said Letters Patent is hereby corrected as shown below:

In the Specification

In Column 5, Line(s) 45, after "discharged", delete ",".

In Column 5, Line(s) 52, after "performs", delete ",".

In Column 7, Line(s) 27, delete "U-shaped" and insert --L-shaped--, therefor.

In Column 7, Line(s) 51, after "and", delete ",".

In Column 7, Line(s) 55, after "dash", delete ",".

In Column 8, Line(s) 3, delete "4c" and insert --4e--, therefor.

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*